(12) United States Patent
Alavandar et al.

(10) Patent No.: US 8,375,427 B2
(45) Date of Patent: Feb. 12, 2013

(54) HOLISTIC RISK-BASED IDENTITY ESTABLISHMENT FOR ELIGIBILITY DETERMINATIONS IN CONTEXT OF AN APPLICATION

(75) Inventors: Narayanan Alavandar, Bangalore (IN); Ravi S. Arunachalam, Bangalore (IN); Dennis A. Carlton, Herndon, VA (US); Tim M. Corcoran, Washington, DC (US); Hung T. Kwan, Grand Praire, TX (US); William F. Willis, Herndon, VA (US); J. Gary Woodward, Holland, TX (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 12/764,570

(22) Filed: Apr. 21, 2010

(65) Prior Publication Data

US 2011/0265162 A1 Oct. 27, 2011

(51) Int. Cl.
*G06F 17/30* (2006.01)
(52) U.S. Cl. ............................. 726/7; 726/21; 726/25
(58) Field of Classification Search ................ 726/7, 21, 726/25
See application file for complete search history.

(56) References Cited

U.S. PATENT DOCUMENTS

| 7,302,634 | B2 | 11/2007 | Lucovsky et al. | |
|---|---|---|---|---|
| 7,403,922 | B1 * | 7/2008 | Lewis et al. | 705/38 |
| 7,493,403 | B2 | 2/2009 | Shull et al. | |
| 2004/0153663 | A1 * | 8/2004 | Clark et al. | 713/200 |
| 2006/0178982 | A1 | 8/2006 | Ramsey et al. | |
| 2006/0282660 | A1 | 12/2006 | Varghese et al. | |
| 2007/0112667 | A1 | 5/2007 | Rucker | |
| 2007/0162761 | A1 * | 7/2007 | Davis et al. | 713/182 |
| 2009/0006230 | A1 * | 1/2009 | Lyda et al. | 705/35 |

FOREIGN PATENT DOCUMENTS

CA 1111563 10/1981

OTHER PUBLICATIONS

Gupta, M., et al., "Security Analysis of Internet Technology Components Enabling Globally Distributed Workplaces—A Framework," ACM Digital Library, vol. 8, No. 4, Art 17, Sep. 2008.
McGlohon, M., et al., "SNARE: A Link Analytic System for Graph Labeling and Risk Detection," ACM Digital Library, pp. 1265-1275, Jun./Jul. 2009.

* cited by examiner

*Primary Examiner* — Kambiz Zand
*Assistant Examiner* — Amare F Tabor
(74) *Attorney, Agent, or Firm* — Patents on Demand P.A.; Brian K. Buchheit; Scott M. Garrett

(57) ABSTRACT

A set of Service Oriented Architecture (SOA) services can be utilized by applications executing in protected application environments external to a SOA environment. The SOA services can include an identity service, a eligibility service, and a security risk assessment service, each of which generates a percentage of risk when run. SOA services can be dependent on specific applications and application cases, each being a specific context of an application, so that results vary by application case. The SOA environment can store data, which is constantly being updated about people, which is used by the SOA services. In one embodiment, sensitive or confidential data can be maintained in the protected application environment and can be isolated from the SOA environment. Rules, criteria, factors, and the like used by the SOA services can be customized at an arbitrary level of complexity for specific applications and application cases.

17 Claims, 9 Drawing Sheets

Identity/Eligibility Lifecycle 600

Phase 1 – Establish Baseline Requirements 610

- Establish risk categories for SOA Environment
- Define trust scores for data sources at individual data element level
- Define risk assessment criteria, statements, and evidence
- Define scoring rules to quantify risk assessment results
- Establish identity/eligibility sub-processes within process steps

Phase 2 – Execute processes and subprocesses 620

- During enrollment processing, appropriate risk engines are accessed
- Risk engines determine risks results using criteria defined in Phase 1
- Risk scoring rules are applied to risk results to produce and aggregate scores within child risk and parent categories
- Risk scores and results are presented to an adjucator to enhance decision support process
- Identity/Eligibility credentials are issued to approved users

Phase 3 – Optimize/Maintenance 630

- Specific risk factors are assessed based on business risk rules
- Risk assessment alerts are triggered by new case events, risk factors which are traceable
- Trust scores are created and continuously updated
- Business intelligence and optimization techniques are used to continuously analyze and provide feedback

FIG. 6A

Subprocesses occurring throughout lifecycle 650

HOLISTIC RISK-BASED IDENTITY ESTABLISHMENT FOR ELIGIBILITY DETERMINATIONS IN CONTEXT OF AN APPLICATION

BACKGROUND

The present invention relates to the field of security and, more particularly, to holistic risk-based identity establishment for eligibility determinations in context of an application.

Different security measures exist to secure protected assets such as access to secured facilities and receiving protected services. These measures tend to be implemented in a uniform manner regardless of the specific context in which the measures are executed. Further, these measures tend to be implemented within a protected enterprise environment. Conventional security measures also tend to be implemented on a per-transaction basis, where each transaction is handled in an isolated, discrete fashion. That is, the question being posed and answered by the security measures is whether or not that particular transaction is legitimate as a whole, and risk is assessed (if at all) on this per-transaction basis. Many industry standards exist to permit best practice security measures to be implemented within an organization and associated entities, which can be used for security.

Frequently, however, these measures can result in limited security and/or excessive security which fails to adapt to domain specific requirements. When limited security is implemented, the risk of breaches can increase dramatically exposing sensitive information and services to unwanted personnel and/or entities. When excessive security is implemented, many problems can arise including over-complexity, numerous inefficiencies, and costly upkeep. Further, excessive security can have a deleterious effect of overcompensating resulting in problems of determining situational appropriate security measures. The security measure's shortcomings are particularly detrimental to identity verification processes.

Traditional approaches to identity verification utilize an industry accepted "three factor identification" model. These three identity factors are defined as "Who you are?", "What you know?", and "What you own?". "Who you are" often includes physical and behavioral features of a person such as fingerprints, facial features, and other biometric and physical features. "What you know" frequently includes information presumed to be known to the person to be identified such as passwords, individual/family data, and other data or information. "What you own" traditionally refers to physical objects that are owned by, or legitimately in the possession of, a person such as a passport, keys, other tokens, driver's license, and other ID card.

This three factor identification model is constrained and hindered by several limitations. A first limitation is the "physical world" concept of individual identification as opposed to a more comprehensive information technology and data-centric approach to identity management. Secondly, the model does not provide for consideration of the operational context in which an identity or eligibility determination is to be performed. The model also fails to provide for risk assessment of other important influencing factors and/or relevant data used in individual identification. Further, the model does not effectively enable or support other key identity management capabilities such as confidentiality, risk management, non-obvious relationship analysis, and "trust" relationship management. Lastly, the model favors a frequently "card" centric identity approach, thus minimizing and overlooking potentially more effective factors that could be used in identifying individuals. These shortcomings are part of the per transaction security paradigm implemented by conventional systems, which assesses security/risks in an isolated per transaction manner, as opposed to in a more holistic or context aware fashion.

An additional individual identification verification solution is required in order to mitigate the significant constraints and limitations of the three factor identity model and associated variations of that model. Further, a new identification verification solution is needed in order to provide and address an organization's required business capabilities and needs (e.g., effective resource utilization, cost reduction, increase revenue), which current identification solutions only marginally consider.

BRIEF SUMMARY

The disclosure can be implemented in numerous configurations depending on implementation choices based upon the principles described herein. Various specific aspects are disclosed, which are illustrative embodiments not to be construed as limiting the scope of the disclosure. One aspect of the disclosure is for a data driven method, computer program product, apparatus, and system for risk based identity establishment for eligibility determinations in context of an executing application. In the aspect, within a service oriented architecture (SOA) environment, a set of SOA services comprising an identity service, an eligibility service, and a security risk assessment service can be provided. Each of the services can be performed independently based on a service-specific set of data and criteria. For example, the identity service can calculate a risk that a person is who they say they are. The eligibility service can calculate a risk that a person is qualified for a type of operation, which can be a completely separate evaluation from whether or not a person is who they assert themselves to being. Finally, the security risk assessment can determine a risk of permitting access to a particular datum item or protected function. Rules can be established that provide specific courses of programmatic actions, which vary based on results of the identity risk, the eligibility risk, and the security assessment risks. Further, different application specific cases, can be associated with different criteria (for assessing the identity risk, eligibility risk, and/or security assessment risks) as well as differing sets of rules for reacting to risk evaluations, such as those provided by the identity, eligibility, and security risk assessment services.

In one embodiment, each of the SOA services can be customized on an application specific basis for a set of different applications. At least a portion of the different applications can execute within protected enterprise environments external to the SOA. The SOA can lack exposure to specifics of application events, intra-application variables, and application specific processes other than explicitly provided through parameters of the SOA services. During the customizing, a number of data items can be defined within a data store of the SOA for each of the different applications. For instance, a set of cases can be defined, where each case represents an application specific context associated with a trigger-able event. The application specific context can require a determination of user identity, eligibility, and security risk in context of the corresponding case. Each of these determinations can be distinct and based upon data sets specific to identity, eligibility, and security risk. Application specific and case specific values can be defined for a set of different identity artifacts, where each identity artifact is a type of artifact for determining an identity of a user. Application specific and case specific values representing configurable eligibility criteria can be defined and stored. Application specific and case specific values representing factors (such as primary and secondary factors) for security risk computations can be stored. Application specific and case specific rules can be defined for calculating identity scores, eligibility scores, and security risks scores. Responsive to the applications executing in computing environments, the SOA can instantiate at least one instance of the identity service, the eligibility service, and the security risk assessment service responsive to an occurrence of an application specific event associated with one of the defined cases. Execution of the instance of the identity service can determine which of the different identity artifacts exist and can compute an identity score based on existing identity artifacts, the case specific values stored for the different identity artifacts, and the stored case specific rules for calculating identity given the one case associated with the application specific event. Execution of the instance of the eligibility service can determine which of the different eligibility criteria have been satisfied and can compute an eligibility score based on the satisfied eligibility criteria and the stored case specific rules for calculating eligibility given the one case associated with the application specific event. Execution of the instance of the security risk assessment service can determining which of the factors are relevant and can compute a security risk score based on values of the relevant factors and the stored case specific rules for calculating security risks given the one case associated with the application specific event. The computed identity score, the computed eligibility score, and the computed security risk score can be returned to the one of the different applications that instantiated the corresponding SOA services. Application execution logic of each of the different applications that instantiate corresponding SOA services can branch along different pathways depending on the computed identity score, the computed eligibility score, and the computed security risk score.

One aspect of the disclosure is for a software method, program, system, and artifact for providing risk based security assessments as SOA services. In the aspect, an application can execute in a protected enterprise environment. Execution of the application can trigger an application event associated with a one of a set of previously defined application cases. The previously defined application cases can be organized in an n-ary tree hierarchy. Each application case can represent an application specific context. Case specific rules and configured values can be inherited among nodes in the n-ary tree hierarchy using object-oriented programming inheritance principles. Responsive to the triggering of the application event, SOA services executing in a SOA environment can be instantiated. The previously defined application case can be passed as a parameter for each of the SOA services. The SOA can lack exposure to specifics of application events, intra-application variables, and application specific processes other than explicitly provided through parameters of the SOA services. In response to the triggering of the SOA services, an identity score, an eligibility score, and a security risk score can be computed. Each score can be computed by the SOA services executing in the SOA environment. A user can be permitted or denied access a user selected portion of the executing application associated with the one application case based upon whether the computed identity score, the computed eligibility score, and the computed security risk score exceed previously established score thresholds or not. Each score can comprise a percentage denoting a risk associated with that score.

One aspect of the disclosure is for a software method, program, system, and artifact for providing risk based security assessments as SOA services. In the aspect, a Web service initiation message to execute an identity service from an application executing in a protected enterprise environment can be received. The message can specify an application case as a parameter of the identity service. Responsive to receiving the request for the identity service, the identity service can execute within a SOA environment. Executing the identity service can include: navigating a previously established n-ary tree hierarchy of application cases to locate the application case; using object oriented programming inheritance to determine previously configured application specific parameters for the application service and application case; computing an identity score based on the determined parameters; and returning the identity score to the application. A Web service initiation message to execute an eligibility (can alternatively be referred to as a verification service for verifying eligibility) service from the application executing in a protected enterprise environment can be received, wherein the message specifies an application case as a parameter of the eligibility service. Responsive to receiving the request for the eligibility service, the eligibility service can execute within the SOA environment. The executing of the eligibility service can include: navigating a previously established n-ary tree hierarchy of application cases to locate the application case; using object oriented programming inheritance to determine previously configured application specific parameters for the application service and application case; computing a verification score based on the determined parameters; and returning the eligibility score to the application. A Web service initiation message to execute a risk assessment service from the application executing in the protected enterprise environment can be received. The message can specify an application case as a parameter of the security risk assessment service. Responsive to receiving the request for the security risk assessment service, the security risk assessment service can execute within the SOA environment. The executing of the security risk assessment service can include: navigating a previously established n-ary tree hierarchy of application cases to locate the application case; using object oriented programming inheritance to determine previously configured application specific parameters for the application and application case; computing a security risk score based on the determined parameters; and returning the security risk score to the application. The SOA can lack exposure to specifics of application events, intra-application variables, and application specific processes occurring within the protected enterprise environment. Application execution logic of the application can branch along different pathways depending on the value of the identity score, the eligibility score, and the security risk score.

DETAILED DESCRIPTION

Figure 1:
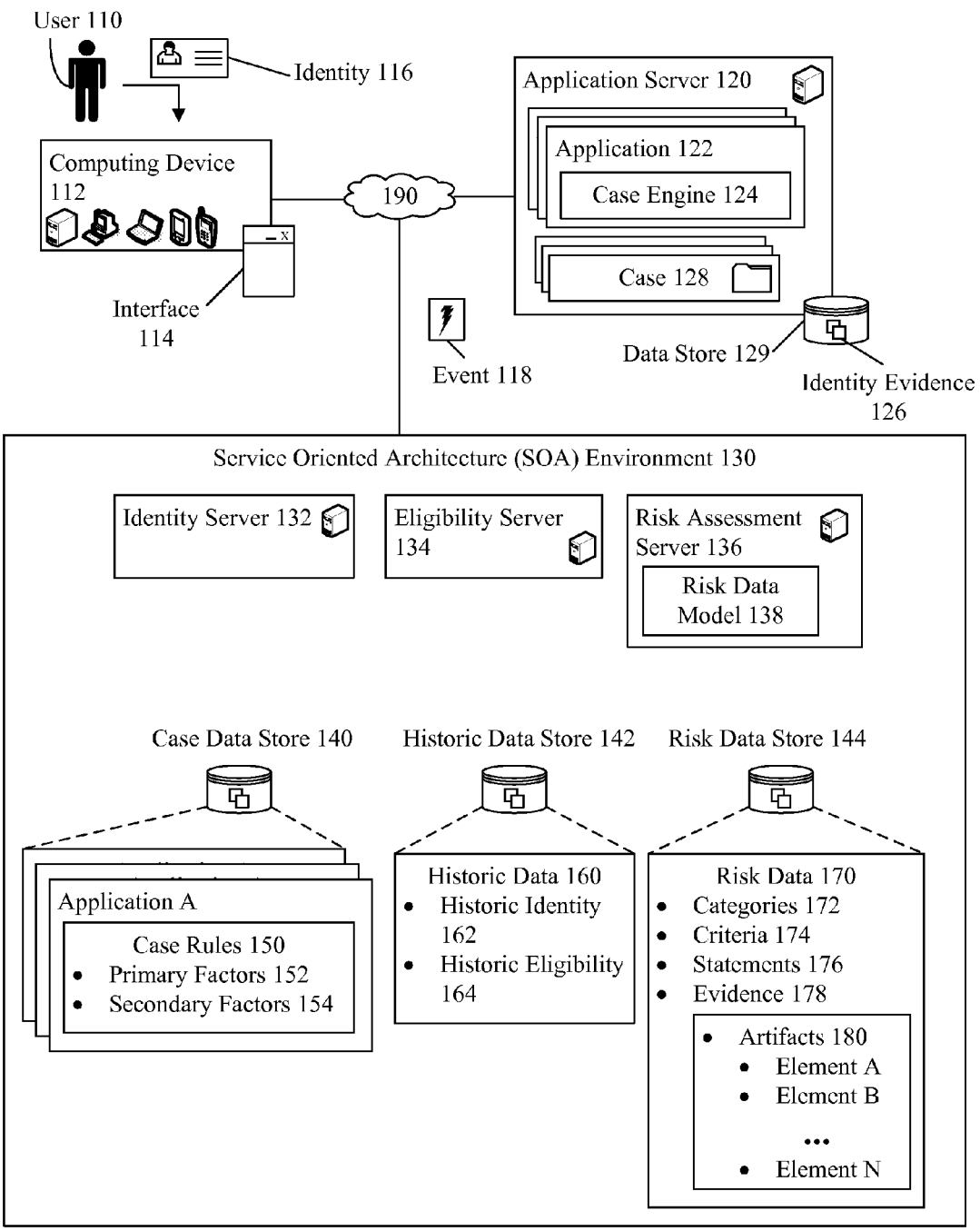
FIG. 1 is a schematic diagram illustrating a system for holistic risk-based identity establishment for eligibility determinations in context of an application in accordance with the embodiments of inventive arrangements disclosed herein.

The disclosure presents a solution for a holistic risk-based identity establishment for eligibility determinations in context of an application. In the solution, a service oriented architecture (SOA) environment can permit efficient and cost-effective individual identification verification and eligibility determination of potential persons. The environment can adapt to dynamic risks, threat factors, vulnerabilities, and domain specific configurations. That is, the environment can address application specific requirements for identity and eligibility processes. The environment can account for differing trust levels of data sources while maintaining auditing processes to be enforced (e.g., traceability). The environment can enhance decision support to relevant personnel (e.g., case workers) and enable adjudicators to make consistent and transparent decisions. In one embodiment, different risks can be individually computed for identity risk (resulting from an identity determination based on identity specific data), for an eligibility risk (resulting from an eligibility determination based on eligibility specific data), and for a security risk (resulting from a security risk determination based on security risk specific data). Application and case specific programmatic rules can be established that are driven by computed values for the identity risk (identity score), eligibility risk (eligibility score), and security risk (security score).

As will be appreciated by one skilled in the art, the disclosure may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a schematic diagram illustrating a system 100 for holistic risk-based identity establishment for eligibility determinations in context of an application in accordance with the embodiments of inventive arrangements disclosed herein. In system 100, a user 110 interacting with an application 122 can trigger event 118 to be communicated to service oriented architecture (SOA) environment 130. For instance, a user 110 enrolling in a healthcare program via a Web site of a healthcare provider can initiate an identity validation event to verify the identity of user 110. SOA environment 130 can perform risk-based individual identification verification and a separate eligibility determination (which generates an eligibility risk) in response to user 110 interaction with application 122. A separate security risk assessment determination can also be performed. In one instance, SOA environment 130 can be a JAVA 2 ENTERPRISE EDITION (J2EE) environment permitting a loose integration of services to employ risk assessment processes throughout an identity lifecycle. In one embodiment, identity, eligibility, risk assessment, and other functions of SOA environment 130 can be provided as services, such as Web services. For example, environment 130 can provide one or more IBM GOVERNMENT TRUSTED IDENTITY MANAGEMENT SERVICES (GTIMS) in one contemplated embodiment.

User 110 can interact with application 122 utilizing interface 114. Interface 114 can be one or more traditional user interfaces including, but not limited to, graphical user interface (GUI), voice user interface (VUI), multi-modal interface, and the like. In one instance, interface 114 can be an interface associated with an integrated circuit card (e.g., smart card) reader. Interface 114 can be associated with computing device 112 which can be communicatively linked to application server 120 and service oriented architecture environment 130 via network 190. Network 190 can be one or more public and/or local networks including, but not limited to, local area networks, wide area networks (e.g., metropolitan area networks), and the like. In one embodiment, network 190 can be the Internet. In the embodiment, secure communication protocols can be utilized to permit protected communication of user 110 identity 116 to an application server 120 and/or SOA environment 130. For instance, privacy enhancing technologies (PET) can be employed within system 100 to ensure security compliance.

As used herein, identity 116 can be one or more individual identification artifacts permitting identification of user 110. Identity 116 can include, but is not limited to, driver's license, passport, birth certificate, and the like. Identity 116 can be communicated in real-time or non-real-time which can be associated with one or more cases. That is, user 110 identity 116 can be associated with a collection of data (e.g., case 128) able to identify a user 110 and determine user 110 request. In one embodiment, case 128 can store information regarding a user 110 requesting enrollment in a service and/or benefits program. For example, case 128 can be associated with an unemployment benefits program and can comprise of user 110 biometrics (e.g., age, fingerprints), user 110 current employment status, and duration of unemployment.

In one embodiment, identity 116 can be stored within data store 129 which can be associated with application server 120. In the embodiment, data store 129 can comprise of identity evidence 126 which can include, but is not limited to, individual identification information (e.g., passport). It should be appreciated that data store 129 can be locally and/or remotely communicatively linked to application server 120. In one instance, data store 129 can be part of a traditional identity management system. For instance, data store 129 can be a government identity database capable of identifying citizens, non-citizens, immigrants, and the like. In one embodiment, data store 129 can be one or more data stores which can be communicatively linked. For instance, data store 129 can be a collection of enterprise and government data sources able to share identity evidence 126. Data store 129 can also represent a distributed storage space comprising a plurality of different tangible storage mediums located geographically separated regions, which are nevertheless connected via network 190.

Application server 120 can be one or more computing devices permitting application 122 to be executed. Application 122 can include, but is not limited to, software/middleware applications permitting user 110 interaction with public and/or local services/benefits program. Services/benefits programs can include, but is not limited to, government assisted healthcare programs, pension programs, health insurance programs, and the like. For example, application 122 can be a Web site permitting submission of immigration requests from immigrants seeking admission into a country. Application 122 can be associated with case engine 124 which can determine user 110 identity and eligibility utilizing limited risk assessment and security models. For instance, case engine 124 can be a software determination program based on a traditional three identity factor model.

Case 128 can be associated with one or more portions of identity evidence 126. Evidence 126 can include one or more artifacts 180 which can include physical and/or digital identities. Evidence 126 can include, but is not limited to, biographic information, physical/digital documentation, biometric information, and the like. In one embodiment, evidence 126 can include handwritten documentation, photographic copies, digitally encoded identities, and the like. For instance, evidence 126 can include a government issued national identification card. It should be noted, the present disclosure can be implemented in environments utilizing traditional "card-centric" approaches. That is, the present disclosure can augment traditional identity management environments enabling extensible configurable risk-based identity and eligibility business processes which can overcome traditional limitations.

When user 110 interacts with application 122, event 118 can be triggered. In one embodiment, event 118 can be triggered responsive to a user 110 enrollment in a services/benefit program (e.g., income supplementation) associated with application 122. In another embodiment, event 118 can be conveyed to SOA environment 130 via user 110 initiated request. For example, a user 110 request to upgrade health insurance benefits can trigger event 118. In one instance, event 118 can be triggered by one or more transactions, including, but not limited to, business-to-business transactions, business-to-government transactions, and the like.

It should be appreciated, system 100 can perform functionality described herein in real-time and/or near real-time. System 100 can include one or more computing devices 112, application servers 120, applications 122, and environments 130. That is, system 100 can be a large scale implementation of a risk based identity and eligibility determination infrastructure. Risk assessment performed in the present disclosure can include qualitative and/or quantitative risk analyses. For example, risk can be represented in a scalar manner (e.g., low, medium, and high risk) enabling human agents to be easily aided in decision making processes. Distinct risk determinations can be conducted for an identity risk, for an eligibility risk and for a security risks, each being based on different data sets and criteria, which can each be case 128 specific. Application 122 specific actions can be taken, which are dependent on computed values for identity risks, eligibility risks, and/or security risks.

SOA environment 130 can be one or more software/middleware components able to provide holistic risk-based identity establishment for eligibility determinations in context of an application. Environment 130 can comprise, but is not limited to, identity server 132, eligibility server 134, risk assessment server 136, case data store 140, historic data store 142, and risk data store 144. In one embodiment, environment 130 can be an IBM WEBPSHERE middleware software. Servers 132 can be communicatively linked to data stores 140-144. For instance, environment 130 can be a national information infrastructure (e.g., government information technology infrastructure) allowing communication between components 132-144. That is, components 130 cooperatively function although distributed throughout a geographic region.

In one embodiment, environment 130 can conform to a representational state transfer (REST) architecture.

In one embodiment, environment 130 can generate statements 176 throughout an identity/eligibility lifecycle 600. Statements 176 can be utilized by environment 130 components and/or human agents to perform end-to-end risk-based assessments for identity establishment and eligibility determinations with respect to case specific criteria and application specific requirements. For instance, environment 130 can be used simultaneously by multiple applications 122 for determining identity and establishing eligibility for multiple service/benefits programs.

It should be noted that environment 130 can enable key identity management capabilities. In one instance, environment 130 can comply with traditional industry security policies and procedures for protecting identity, managing risk, and establishing non-obvious relationships which current solutions lack. That is, environment 130 can be transparently compatible with current technologies and implementations while providing a holistic risk-based approach. Further, environment 130 functionality can include, but is not limited to, adaptive capabilities, predictive (e.g., non-valid prevention) abilities, and self-optimization.

In one embodiment, identity server 132, eligibility server 134 can act cooperatively with risk assessment server 136 to generate a holistic risk-based identity establishment. That is, for each decision making process within the SOA environment, risk assessment can be performed by utilizing risk assessment server 136. In one embodiment, server 132-136 can be one or more Web-based services able to communicate in real-time (e.g., enterprise-to-enterprise callouts). For example, environment 130 can be an Enterprise Java Bean environment for performing risk assessment throughout an identity establishment and eligibility determination process.

Figure 2:
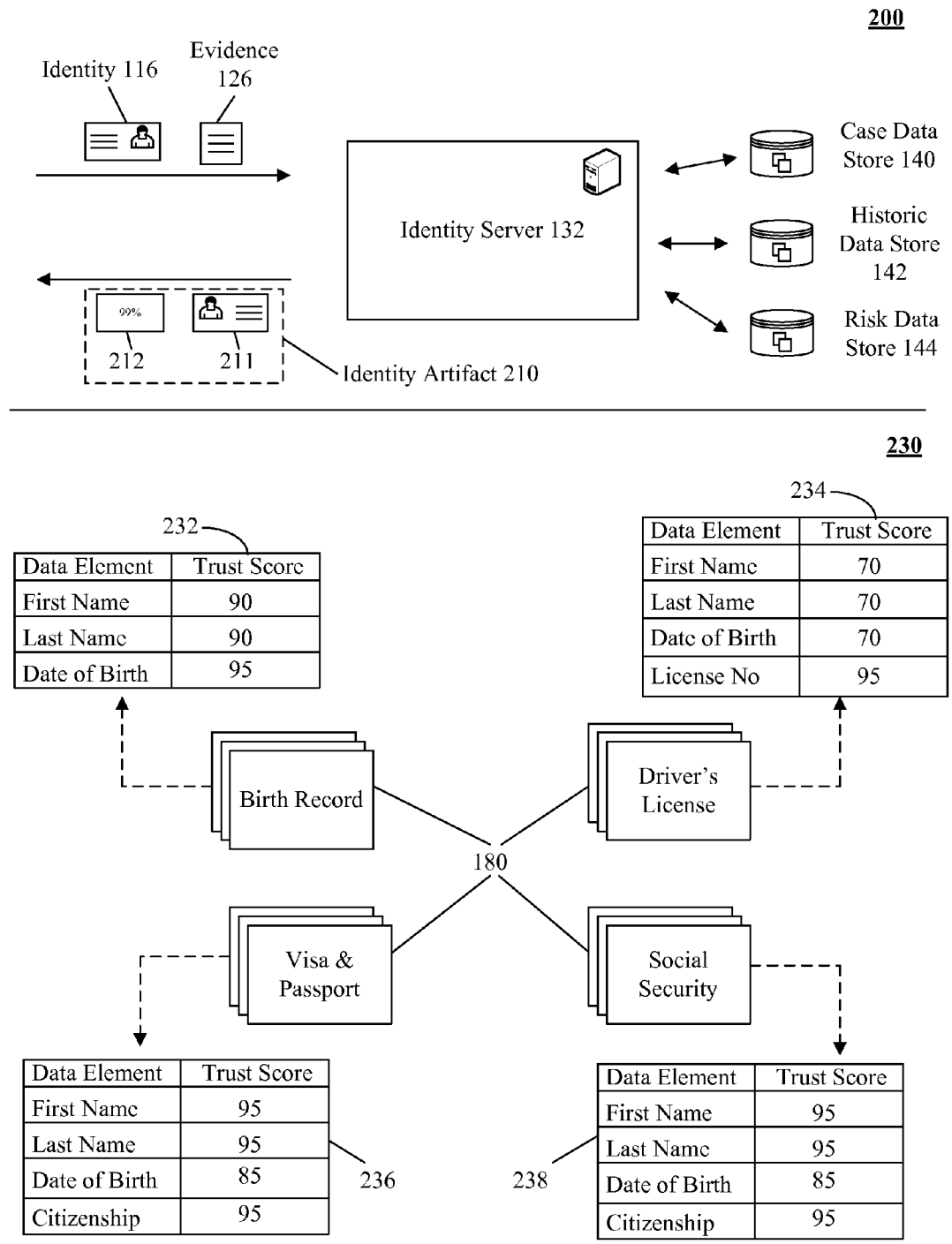
FIG. 2 is a schematic diagram illustrating an identity server and an embodiment for holistic risk-based identity establishment for eligibility determinations in context of an application in accordance with the embodiments of inventive arrangements disclosed herein.

Turning to identity server 132 in FIG. 2, a user 110 identity 116 and evidence 126 can be communicated to identity server 132. It should be emphasized, as shown by FIG. 2, that an identity score and/or identity risk (part of risk assessment results 212) can be computed independent of eligibility and/or security risk based on identity specific data and criteria. Further, in one embodiment, a set of data can exist that is accessible by any of the servers 132-136, which allows for efficient use and non-siloed computations of the various risks. Server 132 can be one or more computing devices able to perform individual information identity validation using a risk data model 138. Server 132 can perform risk-based identity verification utilizing information contained in data stores 140-144. Utilizing application specific case rules 150, historic identity 162, and risk data 170, server 132 can generate identity artifact 210.

Identity artifact 210 can comprise of, but is not limited to, one or more individual identification data sets 211 and one or more risk assessment results 212. In one embodiment, individual identification data sets 211 can be a comprehensive identity profile. In one instance, risk assessment result 212 can indicate the level of confidence associated with individual identification 211. For instance, result 212 can indicate the degree of accuracy of identification 211 and associated risk factors. Risk assessment results 212 can be generated by risk assessment server 136 utilizing risk data model 138 and data stores 140-144. Risk assessment results 212 can include qualitative and/or qualitative risk analysis of identity 116 in association with a case 128, application 122, case rules 150, historic data 160, and risk data 170. That is, utilizing multiple disparate data sources 129, 140-144, a holistic risk-based identity verification can be performed.

In one instance, identity artifact 210 can be cached enabling environment 130 resource conservation and rapid identity verification to be achieved. In the embodiment, cached artifacts can be associated with timeout values enabling artifacts to be valid for a duration of time. For instance, the artifact 210 can be persisted throughout a transaction and deleted when the transaction is terminated.

In embodiment 230, risk assessment results 212 can be computed through defining levels of trust for data sources 129 and evidence 126. In the embodiment 230, evidence 126 can be decomposed into individualized elements (e.g., first name, date of birth). Each of the individualized elements can be associated with a level of trust such as a trust score. The trust score for each of the individualized elements can be generated by risk assessment server 136 utilizing risk data model 138 and risk data 170. In one embodiment, risk assessment results 212 can be generated utilizing data sets 232-238 from artifacts 180. That is, employing individualized element trust scores, an aggregate level of trust can be assigned to data sources 129. It should be appreciated that trust scores can directly correspond to risk and risk factors 152, 154, 172-174.

Artifacts 180 associated with identifying a user 110 can be one or more portions of identity evidence 126. Artifacts 180 can include, but is not limited to, birth record, visa and passport entities, driver's license, social security information, and the like. For each artifact 180, trust score data sets 232-238 can be established. Trust score data sets 232-238 can be generated indicating a level of trust for each individual element. For instance, trust score data set 232 associated with birth record can include a trust score for the user 110 first name (e.g., ninety), last name (e.g., ninety), and date of birth (e.g., ninety five). In one instance, trust scores can be generated in real-time permitting risk assessment to be adaptive to internal and external changes. For instance, when a driver's license is determined to be non-valid, additional artifacts such as birth records can be analyzed to adjust trust scores appropriately.

In one embodiment, data sets 232-238 can be organized into a registry permitting a tracing of each element back to a data source. In the embodiment, data sets 232-238 can permit environment 130 to be selectively and hierarchically auditable. For example, a human agent can analyze each data source and associated artifacts 180 for each component of identity artifact 210. That is, data sets 232-238 can permit risk assessment and traceability to be performed at every level of granularity in environment 130.

Server 132 can include ranking and weighting functionality permitting highly customizable conflict resolution to be enacted. In one embodiment, individualized elements (e.g., first name) of artifacts 180 can be ranked in order of risk. For instance, when multiple first names for user 110 exist, the first name occurring most frequently can be ranked as the element with the least risk. In another embodiment, elements of artifacts 180 with risk below a threshold value can be assigned more weight than those above the threshold value. That is, based on case 128 requirements one or more portions of artifacts 180 can be prioritized appropriately.

Identity server 132 can respond to varying levels of risk based on assessment of identity 116. In one embodiment, server 132 can notify authorities when non-valid identity artifact 116 is detected. In another embodiment, server 132 can flag one or more portions of evidence 126 when the evidence 126 is associated with high risk. For example, when identity 116 is suspected of duplication, a notification can be associated with the case associated with user 110. Further, identity server 132 can compensate for risk associated with legally-questionable activities. For example, utilizing criteria 174 legally-questionable activities can be assigned varying levels of risk which can be assessed when a user 110 is associated with legally-questionable activities.

Figure 3:
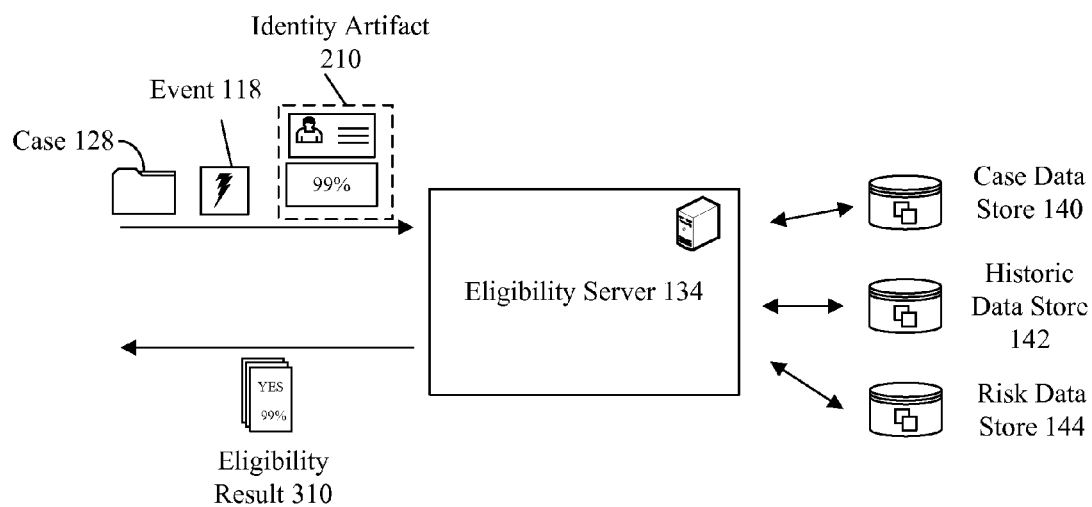
FIG. 3 is a schematic diagram illustrating an eligibility server for holistic risk-based identity establishment for eligibility determinations in context of an application in accordance with the embodiments of inventive arrangements disclosed herein.

Turning to FIG. 3, if a user 110 identity is verified, identity artifact 210, event 118 and case 128 can be communicated to eligibility server 134. Server 134 can utilize identity artifact 210 to determine if domain specific requirements are met. That is, based on the risk assessment result 212 of identity 211, an eligibility determination can be performed in an application specific manner. For instance, utilizing information 210, 118, case 128, server 134 can determine if a user 110 is eligible for a student visa. In one instance, eligibility server 134 can perform simultaneous eligibility determinations. In the instance, server 134 can establish eligibility of user 110 for multiple service/benefit programs concurrently.

In another embodiment, server 134 can be utilized to establish eligibility for multiple benefits for a single benefits program. In one instance, server 134 can enable real-time eligibility determination in system 100. For example, server 134 can be a Web service able to present eligibility result 310 within a Web page presented to user 110.

Server 134 can communicate with data stores 140-144 to generate eligibility result 310. In one embodiment, server 134 can utilize case rules 150, historic eligibility 164, risk data 170, and risk data model 138 to determine user 110 eligibility. Case rules 150 can include risk restrictions and/or risk requirements for specific case types. For instance, case rules 150 can be utilized to specify minimum/maximum levels of risk for each case type. Historic eligibility 164 can be permit eligibility history of user 110 to be factored into the eligibility result 310 to present a holistic view of user 110 eligibility.

Eligibility result 310 can be one or more risk assessment analyses of a case 128 and identity 210 based on event 118. Result 310 can include, but is not limited to, risk of granting eligibility, risk of eligibility denial, risk associated with eligibility for a service and/or benefit, and the like. In one embodiment, result 310 can include a hierarchical organization of risk for a case 128. That is, result 310 can present an adjudicator with a comprehensive view of case 128 risks in the context of a specific application associated with the case 128. For example, result 310 can present graphs and/or charts indicating identity 210 confidence, risk associated with identity 210, eligibility risk, and the like. In one embodiment, historic eligibility 164 can be automatically updated based on eligibility result 310. That is, environment 130 can utilize feedback loops to respond to changes in user 110 eligibility.

Based on result 310, appropriate actions can be executed by eligibility server 134. In one embodiment, when a user 110 is determined to be eligible, server 134 can register (e.g., enroll) the user 110 into a suitable program (e.g., student Visa versus business Visa) based on assessed risk. In one configuration of the embodiment, server 134 automatically can select and/or propose suitable programs based on eligibility result 310. That is, utilizing risk assessment data 170, eligibility decisions can be automated for each case 128 type. In another embodiment, eligibility decisions can be subject to human agent approval before a case 128 decision is performed. In one embodiment, when a user 110 is determined to be ineligible, risks associated with the case 128 can be enumerated in eligibility result 310. For instance, high risk criteria associated with a user 110 can be flagged for adjudicator review.

In one instance, server 134 can perform notification functionality based on risk result 310. In one embodiment of the instance, server 134 can notify user 110 and/or an adjudicator of denial or approval of case 128. Notification can include, but is not limited to, digitally encoded notifications and/or non-digitally encoded notifications. For instance, server 134 can automatically notify a user 110 of eligibility for a desired program via email. In one instance, notifications can include message passing functionality able to automatically update external entities (e.g., non-valid watch list) based on result 310.

In environment 130 of FIG. 1, risk assessment server 136 can be one or more risk assessment components permitting risk determination and/or risk analysis. Server 136 can comprise, but is not limited to, risk data model 138 (e.g., risk data model 500). In one instance, risk assessment server 136 can include one or more risk engines including, but not limited to, biographic proofing engine, document proofing engine, de-duplication engine, biometric matching engine, relationship resolution engine, and the like.

In the embodiment, the risk engines can use defined criteria to determine risk results. For instance, a biographic proofing engine can assess risk-based on correctness of the biographic details submitted by an applicant against a pre-configured list of evidence data sources. That is, server 136 functionality is highly configurable for application specific requirements.

Risk data model 138 can be utilized to generate and/or analyze risk data 170. Data 170 can include, but is not limited to, categories 172, criteria 174, statements 176, evidence 178, and artifacts 180. Data 170 can be automatically and/or manually generated based on environment 130 implementations. In one embodiment, server 136 can heuristically determine risk category 172 and/or risk assessment criteria 174 based on historic data 160. For instance, risk associated with criteria 174 can be automatically re-evaluated in response to changes in service/benefits requirements. In one embodiment, server 136 can be a Web-enabled service, permitting risk assessment to be performed by components associated with environment 130.

Figure 4:
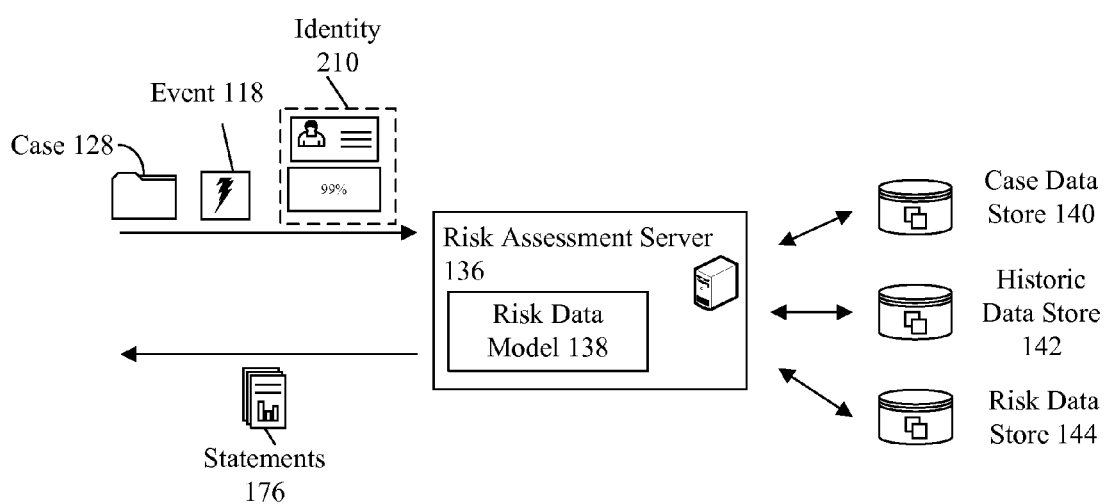
FIG. 4 is a schematic diagram illustrating a risk assessment server for holistic risk-based identity establishment for eligibility determinations in context of an application in accordance with the embodiments of inventive arrangements disclosed herein.

In FIG. 4 (embodiment 400), risk assessment server 136 can receive case 128, event 118, and/or identity 210 information and generate statement 410. In one embodiment, risk server 136 can include one or more risk engines permitting proofing of risk categories 172 and risk assessment criteria 174. For instance, server 136 can be used to verify information (e.g., biographic information) based on submitted identity 116. Server 136 can perform one or more functions including, but not limited to, proofing, duplication detection, matching, conflict resolution, and the like.

Risk categories 172 can be associated with one or more case types within an application 122. Categories 172 can include, but are not limited to identity risk, eligibility risk, security risk, and the like. In one instance, categories 172 can be arbitrarily complex. That is, multiple levels of subcategories can be established for each category 172. Categories 172 can be case type dependent allowing highly configurable identity and eligibility determinations to be achieved.

Risk assessment criteria 174 can be associated with one or more risk categories 172 determination of identity and eligibility. Criteria 174 can include, but is not limited to, biometrics, documentation, biographic criteria, criticality criteria, duplication criteria, and the like. Criteria 174 can be associated with one or more primary factors 152 and secondary factors 154 enabling customizable risk assessments. In one embodiment, criteria 174 can have weighted values enabling criteria prioritization to be achieved. For example, risk associated with biometric criteria can be treated with more importance than biographic criteria.

Statements 176 can be one or more risk assessment determinations based on case 128, event 118, and identity 210. In one embodiment, statement 176 can be a human readable document permitting a hierarchical view of risk associated with a case 128. In another embodiment, statement 410 can be a machine readable artifact able to facilitate risk assessment in environment 130. For instance, statement 176 can be an Extensible Markup Language (XML) encoded document containing a risk assessment result 310 for a case 128.

Evidence 178 can be one or more individually identifiable information associated with a case 128. In one embodiment, evidence 178 can be information indicating available evidence at time of analysis. In the embodiment, evidence 178 can be utilized to determine available evidence for performing risk-based analysis. In another embodiment, evidence 178 can be information associated with analyzed evidence 126. For example, evidence 178 can be associated with artifacts 180 and data sets 232-238. That is, evidence 178 can be metadata which can be utilized in performing identity and eligibility determination without requiring frequent and/or persistent access to evidence 126.

As used herein, data stores 140-144 can be one or more software/hardware components capable of storing risk-based information associated with a case within a service/benefit environment. In one embodiment, data stores 140-144 can be one or more traditional database technologies (e.g., database management system).

Figure 5A:
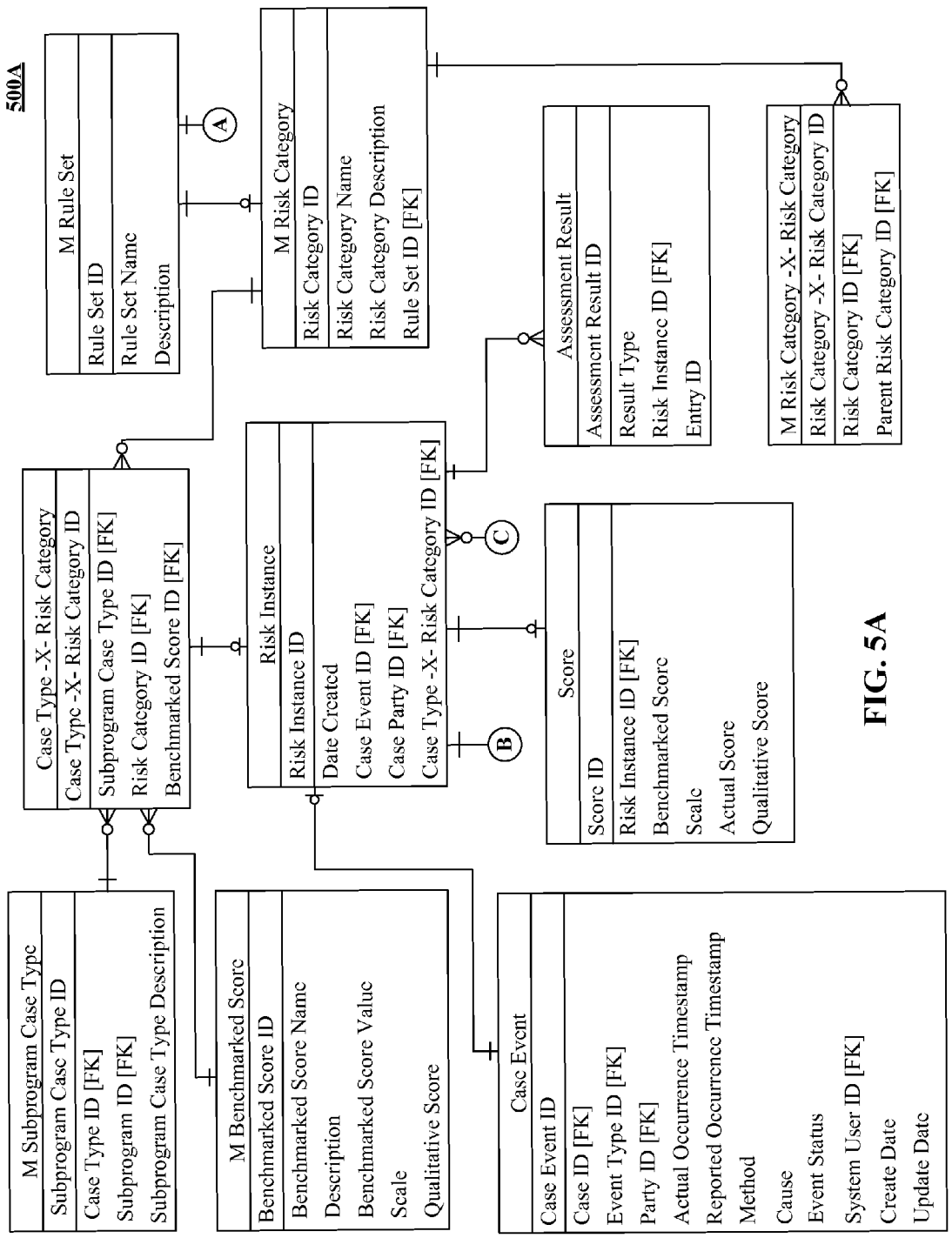
FIG. 5 is a schematic diagram illustrating a risk data model utilized in a service oriented environment (SOA) for holistic risk-based identity establishment for eligibility determinations in context of an application in accordance with the embodiments of inventive arrangements disclosed herein.
Figure 5B:
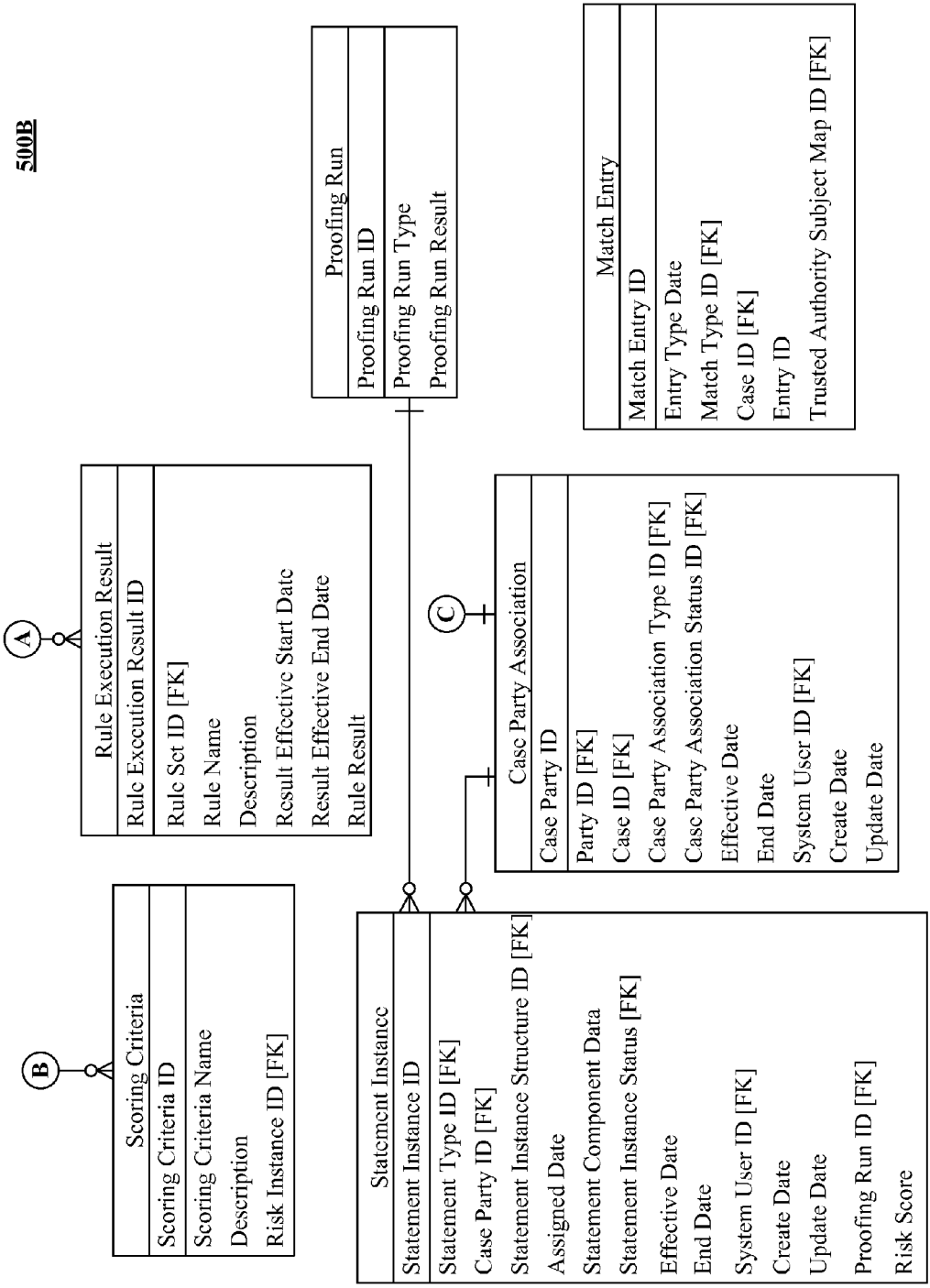

FIGS. 5A & B illustrate a risk data model 500A, 500B for holistic risk-based identity establishment for eligibility determinations in context of an application in accordance with an embodiment of inventive arrangements disclosed herein. Risk data model 500 can be utilized in the context of system 100. In one embodiment, data model 500 can be used by risk assessment server 136 to achieve environment 130 functionality. It should be appreciated that data model 500 is one contemplated embodiment for performing holistic risk-based functionality within environment 130. Alternative risk-based data centric embodiments are contemplated.

Data model 500 can be employed in establishing a risk-based data store such as a contextually appropriate risk-based database for identity and eligibility determination. In one embodiment, a data store conforming to data model 500 can be established for each service/benefit program associated with an application server 120. In an alternative embodiment, a unified data store utilizing data model 500 organizational structures can be created.

Figure 6B:
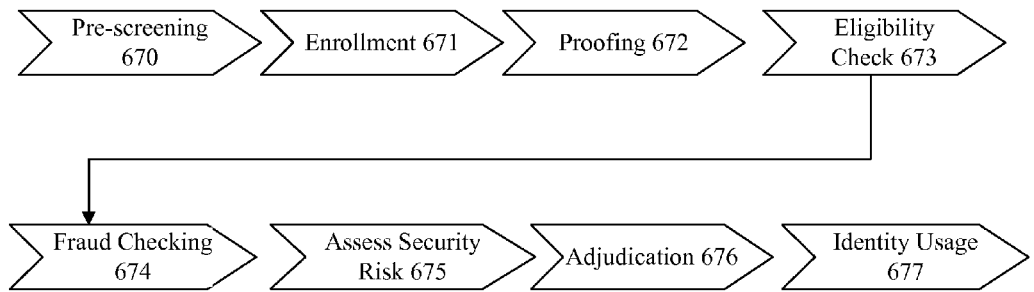
FIG. 6 is a flowchart illustrating an identity and eligibility lifecycle and subprocesses of the identity and eligibility lifecycle for holistic risk-based identity establishment for eligibility determinations in context of an application in accordance with the embodiments of inventive arrangements disclosed herein.

FIGS. 6A & B illustrate a lifecycle 600 and sub-processes 650 for a holistic risk-based identity establishment for eligibility determinations in context of an application in accordance with an embodiment of inventive arrangements disclosed herein. Lifecycle 600 and sub-processes 650 can be performed in the context of system 100. Lifecycle 600 can include, but is not limited to, phases 610-630. Sub-processes 650 can be one or more subordinate processes performed within lifecycle 600. In phase 610, baseline requirements can be established for a service oriented architecture (SOA) environment (e.g., environment 130) permitting context specific risk-based assessment of identity and eligibility. In phase 620, processes and sub-processes of the lifecycle 600 can be executed. In phase 630, optimization and/or maintenance can be performed. It should be appreciated lifecycle 600 can be iteratively optimized based on historic results.

In phase 610, risk categories (e.g., categories 172) can be established for an SOA environment. In one embodiment, risk categories can be manually defined by a human agent. In another embodiment, risk categories can be automatically and/or heuristically determined. Trust scores for data sources can be defined at the individual element level (e.g., embodiment 230). Risk assessment criteria (e.g., criteria 174), statements (e.g., statements 176), and evidence (e.g., evidence 178) can be defined which can include automatic and manual procedures. Scoring rules for quantifying risk assessment results can be defined. Scoring rules can be automatically and/or manually established based on application 122 requirements. Identity/eligibility sub-processes within process steps can be established.

In phase 620, appropriate risk resources can be accessed during an enrollment process. In one embodiment, risk resources can include one or more risk assessment components. In the embodiment, components can include risk engines associated with environment 130 (e.g., risk assessment server 136). Risk resources can determine risk results using criteria defined in phase 610. Risk scoring rules can be applied to risk results to produce and aggregate scores within categories and subordinate categories. Risk scores and results can be presented to an adjudicator to enhance decision support process. For example, adjudicators can be presented with a consolidated view which uses parent-child relationship of risk categories and its association with risk assessment results. Identity/eligibility credentials can be issued to approved users.

In phase 630, specific risk factors can be assessed based on business risk rules. Risk assessment alerts can be triggered by new case events and risk factors which can be traceable. Trust scores can be created and continuously updated which can be assigned to data sources at multiple levels of granularity. Business intelligence and optimization techniques can be used to continuously analyze and provide feedback. For example, business intelligence can be used to identify patterns and/or behaviors of interest such as non-valid identity presentments.

Sub-processes occurring throughout lifecycle 650 can be one or more dependent processes executing within lifecycle 600. Sub-processes 670-677 can be performed in serial and/or parallel. Further, it should be appreciated that sub-processes 670-677 can be iterative and self-optimizing. That is, a feedback loop can be established between any sub-processes 670-677 to enable automatic optimization to be achieved. Sub-processes can include, but are not limited to, pre-screening 670, enrollment, 671, proofing 672, eligibility check 673, non-valid identity checking 674, assess security risk 675, adjudication 676, identity usage 677. One or more sub-processes 670-677 can be optionally omitted based on risk assessment results generated from previous sub-processes 670-677. For instance, if risk assessment results indicate potential non-valid identities during pre-screening, sub-process non-valid identity checking 674 can be executed.

Figure 7:
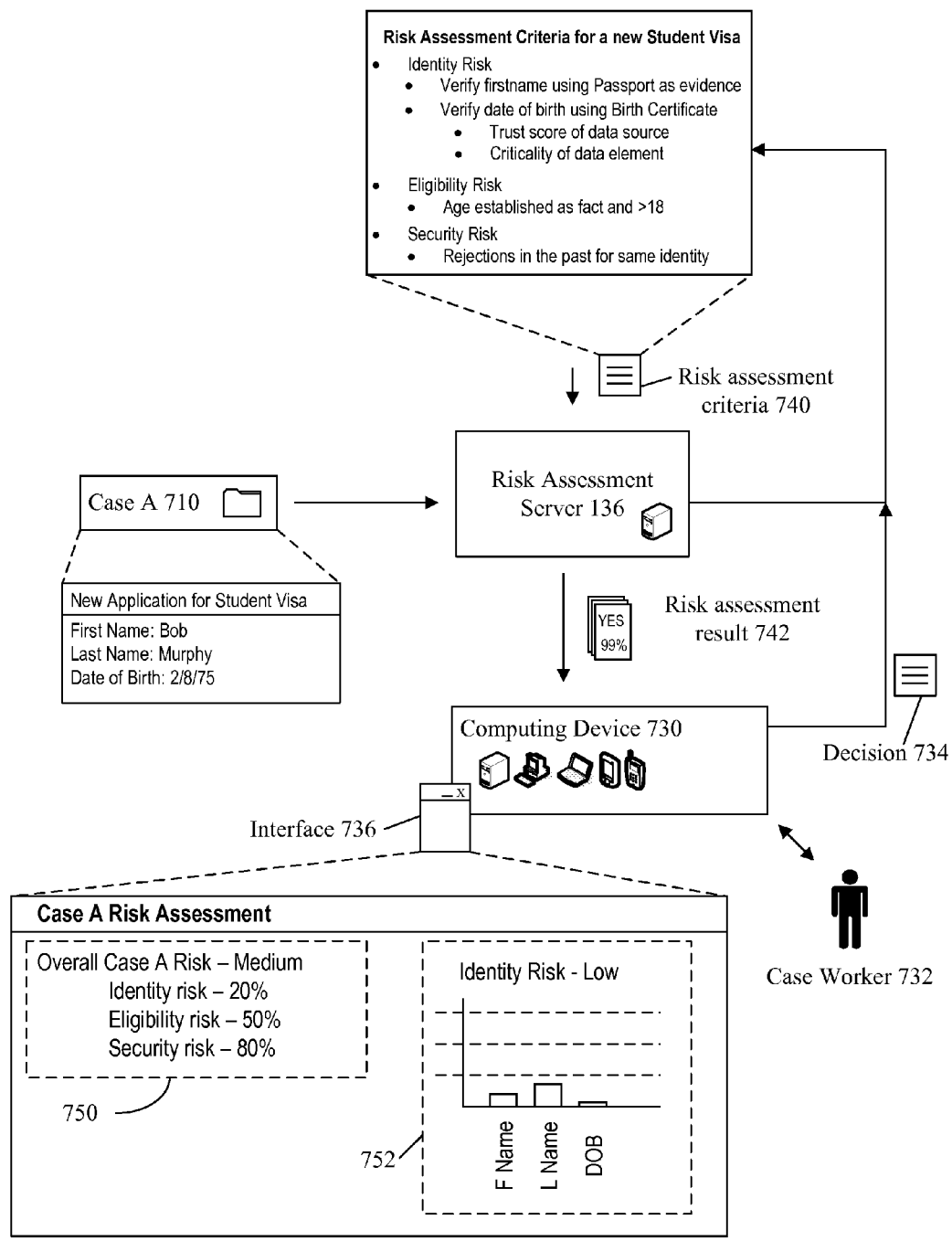
FIG. 7 is a schematic diagram illustrating a scenario 700 for holistic risk-based identity establishment and eligibility determinations in context of an application in accordance with the embodiments of inventive arrangements disclosed herein.

FIG. 7 is a schematic diagram illustrating a scenario 700 for holistic risk-based identity establishment and eligibility determinations in context of an application in accordance with the embodiments of inventive arrangements disclosed herein. In scenario 700, a case worker 732 can be presented with risk assessment results for a Case A 710 via interface 736. Case A 710 can be a new application for a student visa associated with a Visa program of an immigration service. Case worker 732 can interact with interface 736 to perform one or more decisions 734 associated with Case A 710. Utilizing risk assessment criteria specific to Case A 710 case type, appropriate context specific risk assessment results 743 can be generated and conveyed to decision makers (e.g., case worker 732).

In one embodiment, risk assessment result 742 can be presented to a case worker 732 within a trusted identity management software application (e.g., interface 736). Result 742 can comprise of a risk outline 750 and risk details 752. Risk outline 742 can include a summary of Case A 710 risk organized by risk categories. Risk details 752 can include views of artifacts 180, evidence 126, and the like. In one instance, risk details 752 can be one or more visual representations (e.g., graph/charts/images) of risk associated with one or more portions of an artifact 180.

In the scenario 700, decision 734 can be a component of a feedback loop enabling risk assessment criteria to be adaptive to changes in the Visa program. That is, decision 734 can be used to heuristically determine optimum risk assessment criteria 740. In this way, decision makers (e.g., case worker 732) in lifecycle 600 are fully supported and decision making abilities are dynamically enhanced.

Drawings presented herein are for illustrative purposes only and should not be construed to limit the invention in any regard. Scenario 700 can support one or more case workers 732, each having varying access permissions. That is, based on case worker 732 security clearance, customized risk assessment results 742 can be presented. As used herein, computing device 730 can include, but is not limited to, desktop computer, laptop, handheld computing device, PDA, mobile phone, and the like.

The flowchart and block diagrams in the FIGS. 1-7 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented data driven method for risk based identity establishment for eligibility determinations in context of an executing application comprising:

within a service oriented architecture (SOA) environment, providing a plurality of SOA services comprising an identity service, an eligibility service, and a risk assessment service;

within the service oriented architecture environment, customizing each of the SOA services on an application specific basis for a plurality of different applications, wherein said customizing comprises for each of the different applications:

defining within a data store of the service oriented architecture a plurality of cases, each case representing an application specific context associated with a triggerable event, where the application specific context requires a determination of user identity, eligibility, and security risk;

defining within the data store of the service oriented architecture application specific and case specific values for a plurality of different identity artifacts, where each identity artifact is a type of artifact for determining an identity of a user;

defining within the data store of the service oriented architecture application specific and case specific values representing configurable eligibility criteria;

defining within the data store of the service oriented architecture application specific and case specific values representing factors for security risk computations;

defining within the data store of the service oriented architecture application specific and case specific rules for calculating an identity, eligibility, and security risks;

for each of the different applications as the different applications execute, instantiating at least one instance of the identity service, the eligibility service, and the security risk assessment service responsive to an occurrence of an application specific event associated with one of the defined cases, when executing the instance of the identity service determining which of the different identity artifacts exist and computing an identity score based on existing identity artifacts, the case specific values stored for the different identity artifacts, and the stored case specific rules for calculating identity given the one case associated with the application specific event;

when executing the instance of the eligibility service determining which of the different eligibility criteria have been satisfied and computing an eligibility score based on the satisfied eligibility criteria and the stored case specific rules for calculating eligibility given the one case associated with the application specific event;

when executing the instance of the security risk assessment service determining which of the different factors are relevant and computing a security risk score based on values of the relevant factors and the stored case specific rules for calculating security risks given the one case associated with the application specific event; and returning the computed identity score, the computed eligibility score, and the computed security risk score to the one of the different applications that instantiated the corresponding SOA services, wherein application execution logic of each of the different applications that instantiated the corresponding SOA services branch along different pathways depending on the computed identity score, the computed eligibility score, and the computed security risk score;

wherein the above steps are executed on the computer-processor.

2. The method of claim 1, wherein at least a portion of the different applications execute within protected enterprise environments external to the service oriented architecture, where the service oriented architecture lacks exposure to specifics of application events, intra-application variables, and application specific processes other than explicitly provided through parameters of the SOA services.

3. The method of claim 2, wherein protected digital artifacts comprising confidential information of people are stored in the protected enterprise environments, wherein indicators of the existence or absence of the protected digital artifacts are stored in the service oriented architecture environment that otherwise lacks a copy of the protected digital artifacts, wherein the indicators of the existence or absence of the protected digital artifacts is used by the identity service and the eligibility service to compute the identity score and the eligibility score.

4. The method of claim 2, wherein protected digital artifacts comprising confidential information of people are stored in the protected enterprise environments, wherein an address of the protected digital artifacts are stored in the service oriented architecture environment that otherwise lacks a copy of the protected digital artifacts, wherein the stored addresses are used to reference the protected digital artifacts during the execution of the identity service and the eligibility service, wherein the confidential information contained in the protected digital artifacts is not exposed to the service oriented architecture.

5. The method of claim 1, wherein the defining each case within the data store of the service oriented architecture comprises:
defining an n-ary tree hierarchy of cases for each of the different applications, where each of the n-ary trees has a root node, wherein object-oriented programming inheritance is permitted among the nodes of the n-ary tree hierarchy permitting identity artifacts, eligibility criteria, security risk factors, and case specific rules for calculating identity, eligibility, and security risks to be inherited among nodes in the n-ary tree hierarchy.

6. The method of claim 1, wherein each of the computed identity score, the computed eligibility score, and the computed security risk score comprise a percentage denoting a risk associated with that score.

7. The method of claim 1, wherein the service oriented architecture environment retains individual data on a plurality of people from a plurality of different sources, wherein at least a portion of the retained data is extracted from identity artifacts, wherein the computed identity score is a weighed score computed based on the case specific rules, the cases specific values of the different identity artifacts, and the individual retained data.

8. The method of claim 1, wherein each of the defined identity artifacts comprise a plurality of data elements, each data element having an associated trust score unique to the identity artifact, wherein each data element represents information about a person, wherein the trust score is used to weigh the data element relative to other data elements when the identity score is computed.

9. The method of claim 1, wherein information pertaining to a person is continuously being updated and retained within the service oriented architecture, which causes results of otherwise identical executions of identity service instances, eligibility service instances, and security risk assessment instances to vary over time based on the continuously updated and retained data.

10. The method of claim 1, wherein executing the instance of the identity service results in at least one of a plurality of available Web services executing within the service oriented architecture environment that determines an identity from biometric input, wherein the plurality of available Web service comprise a speaker identification and verification Web service based on audio, an identity recognition service that identifies a person based on image analysis technologies, and at least one of an iris identification, and a fingerprint identification service.

11. A computer program product comprising a non-transitory computer readable storage medium having computer usable program code embodied therewith, the computer usable program code comprising:
computer usable program code being stored on a tangible storage medium, when executed by a processor being operable to, within a service oriented architecture (SOA) environment, provide a plurality of SOA services comprising an identity service, an eligibility service, and a risk assessment service;
computer usable program code being stored on a tangible storage medium, when executed by a processor being operable to, within the service oriented architecture environment, customize each of the SOA services on an application specific basis for a plurality of different applications, wherein said customizing comprises: computer usable program code being stored on a tangible storage medium, when executed by a processor being operable to, for each of the different applications:
define within a data store of the service oriented architecture a plurality of cases, each case representing an application specific context associated with a triggerable event, where the application specific context requires a determination of user identity, eligibility, and security risk;
define within the data store of the service oriented architecture application specific and case specific values for a plurality of different identity artifacts, where each identity artifact is a type of artifact for determining an identity of a user;
define within the data store of the service oriented architecture application specific and case specific values representing configurable eligibility criteria;
define within the data store of the service oriented architecture application specific and case specific values representing factors for security risk computations;
define within the data store of the service oriented architecture application specific and case specific rules for calculating an identity, eligibility, and security risks;
for each of the different applications as the different applications execute, instantiating at least one instance of the identity service, the eligibility service, and the security risk assessment service responsive to an occurrence of an application specific event associated with one of the defined cases, computer usable program code being stored on a tangible storage medium, when executed by a processor being operable to, when executing the instance of the identity service, determine which of the different identity artifacts exist and compute an identity score based on existing identity artifacts, the case specific values stored for the different identity artifacts, and the stored case specific rules for calculating identity given the one case associated with the application specific event;
computer usable program code being stored on a tangible storage medium, when executed by a processor being operable to, when executing the instance of the eligibility service determine which of the different eligibility criteria have been satisfied and compute an eligibility score based on the satisfied eligibility criteria and the stored case specific rules for calculating eligibility given the one case associated with the application specific event;

computer usable program code being stored on a tangible storage medium, when executed by a processor being operable to, when executing the instance of the security risk assessment service, determine which of the different factors are relevant and compute a security risk score based on values of the relevant factors and the stored case specific rules for calculate security risks given the one case associated with the application specific event; and computer usable program code being stored on a tangible storage medium, when executed by a processor being operable to, return the computed identity score, the computed eligibility score, and the computed security risk score to the one of the different applications that instantiated the corresponding SOA services, wherein application execution logic of each of the different applications that instantiated the corresponding SOA services branch along different pathways depending on the computed identity score, the computed eligibility score, and the computed security risk score.

12. A software method for providing risk based security assessments as service oriented architecture (SOA) services, said method comprising:

executing an application in a protected enterprise environments, wherein execution of said application triggers an application event associated with a one of a plurality of previously defined application cases, wherein the plurality of previously defined application cases are organized in an n-ary tree hierarchy, wherein each application case represents an application specific context, wherein case specific rules and configured values are inherited among nodes in the n-ary tree hierarchy using object-oriented programming inheritance principles;

responsive to the triggering of the application event, instantiating a plurality of SOA services executing in a service oriented architecture environment, wherein the one previously defined application case is passed as a parameter for each of the SOA services, where the service oriented architecture lacks exposure to specifics of application events, intra-application variables, and application specific processes other than explicitly provided through parameters of the SOA services;

in response to the triggering of the SOA services:

defining within a data store of the service oriented architecture the plurality of previously defined application cases;

defining within the data store of the service oriented architecture application specific and case specific values for a plurality of different identity artifacts, where each identity artifact is a type of artifact for determining an identity of a user, which are used when computing the identity score;

defining within the data store of the service oriented architecture application specific and case specific values representing configurable eligibility criteria, which are used when computing the eligibility score;

defining within the data store of the service oriented architecture application specific and case specific values representing factors for security risk computations, which are used when computing the security risk score;

defining within the data store of the service oriented architecture application specific and case specific rules for calculating the identity score, the eligibility score, and the security risk score;

receiving the computed identity score, the computed eligibility score, and the computed security risk score, each score being computed by the SOA services executing in the service oriented architecture environment; and permitting or denying a user to access a user selected portion of the executing application associated with the one application case based upon whether the computed identity score, the computed eligibility score, and the computed security risk score exceed previously established score thresholds or not, wherein each score comprises a percentage denoting a risk associated with that score, wherein the executing, the instantiating, the defining, the receiving, and the permitting or denying are performed by at least one computer program when the at least one computer program is executed on the one client, wherein the at least one computer program is stored in a tangible, non-transitory storage medium.

13. The method of claim 12, wherein the SOA services comprise an identity service, an eligibility service, and a risk assessment service, wherein the identity score is computed by the identity service, the eligibility score is computed by the eligibility service, and the security risk score is computed by the risk assessment service.

14. The method of claim 12, wherein other than the defined parameters, the application lacks exposure to specifics of how the SOA services compute the identity score, the eligibility score, and the security risk score.

15. A software method for providing risk based security assessments as service oriented architecture services, said method comprising:

receiving a Web service initiation message to execute an identity service from an application executing in a protected enterprise environment, wherein the message specifies an application case as a parameter of the identity service;

responsive to receiving the request for the identity service, executing the identity service within a service oriented architecture environment, wherein executing the identity service comprises:

navigating a previously established n-ary tree hierarchy of application cases to locate the application case;

using object oriented programming inheritance to determine previously configured application specific parameters for the application service and application case;

computing an identity score based on the determined parameters; and returning the identity score to the application;

receiving a Web service initiation message to execute an eligibility service from the application executing in a protected enterprise environment, wherein the message specifies an application case as a parameter of the eligibility service;

responsive to receiving the request for the eligibility service, executing the eligibility service within the service oriented architecture environment, wherein executing the eligibility service comprises:

navigating a previously established n-ary tree hierarchy of application cases to locate the application case;

using object oriented programming inheritance to determine previously configured application specific parameters for the application service and application case;

computing an eligibility score based on the determined parameters; and returning the eligibility score to the application;

receiving a Web service initiation message to execute a risk assessment service from the application executing in the protected enterprise environment, wherein the message specifies an application case as a parameter of the security risk assessment service;

responsive to receiving the request for the security risk assessment service, executing the security risk assessment service within the service oriented architecture environment, wherein executing the security risk assessment service comprises: navigating a previously established n-ary tree hierarchy of application cases to locate the application case;

using object oriented programming inheritance to determine previously configured application specific parameters for the application and application case;

computing a security risk score based on the determined parameters; and returning the security risk score to the application;

wherein the service oriented architecture lacks exposure to specifics of application events, intra-application variables, and application specific processes occurring within the protected enterprise environment, and wherein application execution logic of the application branches along different pathways depending on the value of the identity score, the eligibility score, and the security risk score, wherein the receiving, executing, the navigating, the using, the computing, and the returning are performed by at least one computer program when the at least one computer program is executed on the one client, wherein the at least one computer program is stored in a tangible, non-transitory storage medium.

16. The method of claim 15, further comprising:

defining within a data store of the service oriented architecture a plurality of cases, each case representing an application specific context associated with a triggerable event, where the application specific context requires a determination of user identity, eligibility, and security risk;

defining within the data store of the service oriented architecture application specific and case specific values for a plurality of different identity artifacts, where each identity artifact is a type of artifact for determining an identity of a user;

defining within the data store of the service oriented architecture application specific and case specific values representing configurable eligibility criteria;

defining within the data store of the service oriented architecture application specific and case specific values representing factors for security risk computations; and defining within the data store of the service oriented architecture application specific and case specific rules for calculating an identity score, the eligibility score, and the security risk score;

when executing the identity service determining which of the different identity artifacts exist and computing an identity score based on existing identity artifacts, the case specific values stored for the different identity artifacts, and the stored case specific rules for calculating identity given the application case;

when executing the eligibility service determining which of the different eligibility criteria have been satisfied and computing an eligibility score based on the satisfied eligibility criteria and the stored case specific rules for calculating eligibility given the application case;

when executing the security risk assessment service determining which of the different factors are relevant and computing a security risk score based on values of the relevant factors and the stored case specific rules for calculating security risks given the application case.

17. The method of claim 15, wherein protected digital artifacts comprising confidential information of a person are stored in the protected enterprise environments, wherein indicators of the existence or absence of the protected digital artifacts are stored in the service oriented architecture environment that otherwise lacks a copy of the protected digital artifacts, wherein the indicators of the existence or absence of the protected digital artifacts is used by the identity service and the eligibility service to compute the identity score and the eligibility score.

* * * * *